US011200765B2

(12) United States Patent
Chen

(10) Patent No.: US 11,200,765 B2
(45) Date of Patent: Dec. 14, 2021

(54) LUGGAGE DELIVERY SYSTEM

(71) Applicant: LINGDONG TECHNOLOGY (BEIJING) CO. LTD, Beijing (CN)

(72) Inventor: Chiung Lin Chen, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 629 days.

(21) Appl. No.: 16/079,015

(22) PCT Filed: Aug. 9, 2018

(86) PCT No.: PCT/CN2018/099591
§ 371 (c)(1),
(2) Date: Aug. 22, 2018

(87) PCT Pub. No.: WO2020/029166
PCT Pub. Date: Feb. 13, 2020

(65) Prior Publication Data
US 2021/0056788 A1 Feb. 25, 2021

(51) Int. Cl.
*G07C 9/00* (2020.01)
*A45C 5/03* (2006.01)
(Continued)

(52) U.S. Cl.
CPC ............ *G07C 9/00896* (2013.01); *A45C 5/03* (2013.01); *A45C 5/14* (2013.01); *A45C 13/18* (2013.01);
(Continued)

(58) Field of Classification Search
CPC ............ G07C 9/00896; G07C 9/00563; G07C 2009/0092; A45C 5/03; A45C 5/14;
(Continued)

(56) References Cited

U.S. PATENT DOCUMENTS

2004/0246097 A1* 12/2004 Queenan ............ G07C 9/00896
340/5.61
2009/0226050 A1* 9/2009 Hughes .............. G08B 21/0208
382/124
(Continued)

FOREIGN PATENT DOCUMENTS

CN 104049633 A 9/2014
CN 105231614 A 1/2016
(Continued)

OTHER PUBLICATIONS

International Search Report issued in corresponding International Application No. PCT/CN2018/099591; dated Dec. 19, 2018; State Intellectual Property Office of the P.R. China, Beijing, China, 5 pgs.
(Continued)

*Primary Examiner* — Richard M Camby
(74) *Attorney, Agent, or Firm* — Hauptman Ham, LLP

(57) ABSTRACT

A luggage delivery system contains a sensor array and is configured to locate a receiving user using navigation data and, upon finding the receiving user, request identifying information from the receiving user, compare received identifying information to verifying information received from a remote computing device and/or control module, and, upon verifying that a receiving user is the designated receiving user, unlock to grant the receiving user access to the vehicle interior.

22 Claims, 10 Drawing Sheets

(51) Int. Cl.
*A45C 5/14* (2006.01)
*A45C 13/18* (2006.01)
*A45C 13/26* (2006.01)
*A45C 15/00* (2006.01)
*G05D 1/02* (2020.01)
*G06Q 30/00* (2012.01)
*G06Q 50/28* (2012.01)
*G06Q 50/30* (2012.01)
*H04L 9/32* (2006.01)
*G06K 9/00* (2006.01)
*G10L 17/00* (2013.01)

(52) U.S. Cl.
CPC ............ *A45C 13/262* (2013.01); *A45C 15/00* (2013.01); *G05D 1/0214* (2013.01); *G06Q 30/0185* (2013.01); *G06Q 50/28* (2013.01); *G06Q 50/30* (2013.01); *G07C 9/00563* (2013.01); *H04L 9/3247* (2013.01); *A45C 2013/267* (2013.01); *G06K 9/00087* (2013.01); *G07C 2009/0092* (2013.01); *G10L 17/00* (2013.01)

(58) Field of Classification Search
CPC ....... A45C 13/18; A45C 13/262; A45C 15/00; A45C 2013/267; G05D 1/0214; G06Q 30/0185; G06Q 50/28; G06Q 50/30; H04L 9/3247; G06K 9/00087; G10L 17/00
See application file for complete search history.

(56) References Cited

U.S. PATENT DOCUMENTS

| | | | |
|---|---|---|---|
| 2011/0186397 | A1 | 8/2011 | Sheikh |
| 2014/0277841 | A1* | 9/2014 | Klicpera ............... A45C 13/385 701/2 |
| 2015/0324745 | A1* | 11/2015 | Goodall ................. G06Q 10/08 705/337 |
| 2017/0220040 | A1 | 8/2017 | London |
| 2018/0137705 | A1* | 5/2018 | Wilkinson .......... G07C 9/00896 |
| 2019/0160675 | A1* | 5/2019 | Paschall, II .......... G05D 1/0214 |
| 2019/0389249 | A1* | 12/2019 | Diz ..................... B60B 27/0005 |

FOREIGN PATENT DOCUMENTS

| | | |
|---|---|---|
| CN | 105249643 A | 1/2016 |
| CN | 205390655 U | 7/2016 |
| CN | 205920405 U | 2/2017 |
| WO | 2015120473 A1 | 8/2015 |

OTHER PUBLICATIONS

Written Opinion issued in corresponding International Application No. PCT/CN2018/099591; dated Dec. 19, 2018; State Intellectual Property Office of the P.R. China, Beijing, China, 4 pgs.

* cited by examiner

LUGGAGE DELIVERY SYSTEM

RELATED APPLICATIONS

The present application is a National Phase of International Application Number PCT/CN2018/099591, filed Aug. 9, 2018.

BACKGROUND

Smart luggage systems provide users a means to transport goods and materials without direct manual manipulation of the goods or materials or the container in which the goods are located. Smart luggage systems are programmed with drive systems, guidance systems, and sensors configured to follow users. Smart luggage systems include robotic or self-propelled modules. Smart luggage is increasingly common and increases the convenience and affordability afforded users.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
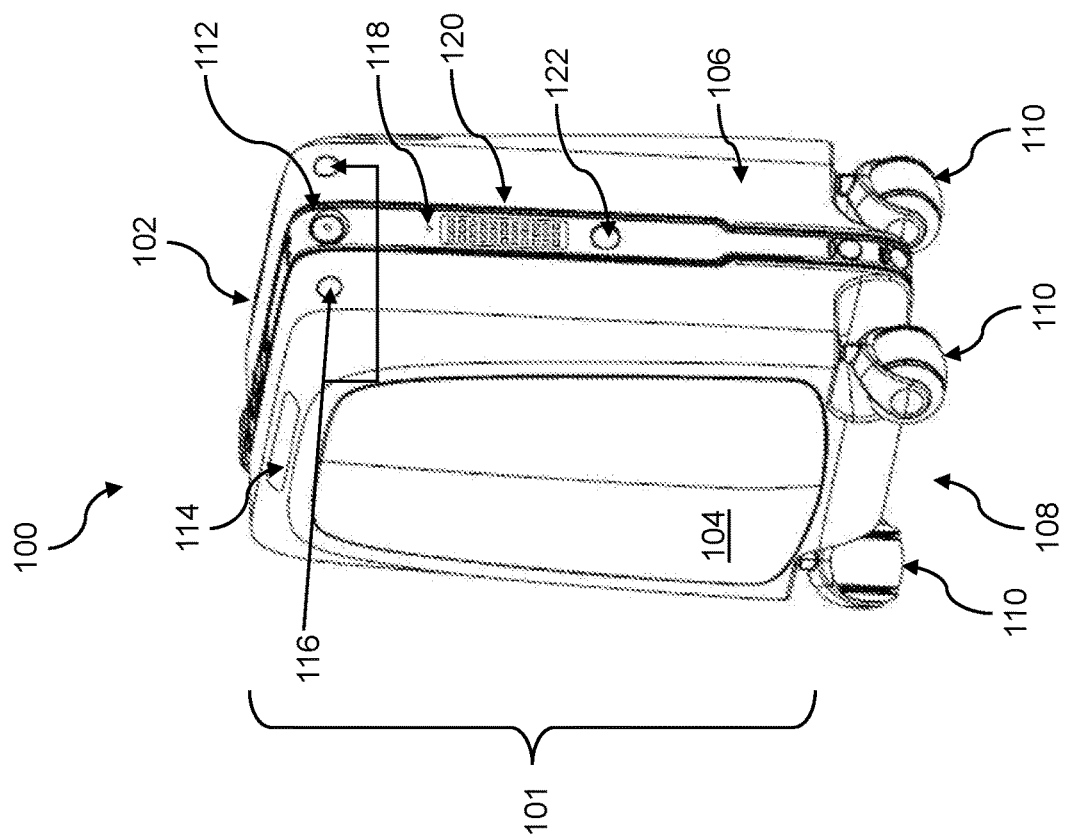
FIG. 1 is diagram of a luggage system configured to move toward a user and unlock upon verification of a user identify, according to some embodiments.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems for facilitating the ability of "smart" luggage to navigate through areas and to provide security for the luggage contents during and after navigation are desirable attributes of luggage systems. Luggage delivery systems are one form of interactive device described, although other forms of interactive devise are also envisioned within the scope of the disclosure.

Recent developments in interconnected devices has led to the development of "smart" luggage, capable of interacting with a user without the user directly handling the luggage. Interactive devices such as smart luggage are capable of transmitting signals to users when the devices exceed a prescribed distance from a location or a device retained by the user. Interactive devices are also capable of maintaining a prescribed distance from a user, or a device retained by the user, as the user moves between locations, such as at an airport or train station. Some smart luggage is capable of providing security for contents of the luggage during navigation from an origin to a destination. Some luggage systems are further capable of, upon arrival at an individual's location, verifying the individual's identity before allowing the luggage system to unlock. Identity-based unlocking and location-based navigation are among the aspects of the present disclosure discussed herein.

The present disclosure relates to a luggage delivery system that incorporates security features of some smart luggage systems, and additional self-navigation features to deliver items from a sender to a receiver, according to some embodiments. In some embodiments, the luggage delivery system has self-navigation features and recipient identification mechanisms. In some embodiments, the sender provides the recipient identification mechanism a user identification. In some embodiments, the sender provides an approximate location for the user for delivery to occur. In some embodiments, the luggage delivery system self-navigates and inspects for the recipient while traveling around an area.

FIG. 1 is diagram of a luggage system 100, according to some embodiments. Luggage system 100 has a vehicle body 101 with a top side 102, an opening side 104, a front side 106 with a plurality of sensors, and a bottom side 108. Wheels 110 are located on the bottom side 108 of the vehicle body 101. Sensors on front side 106 include a camera 112, a microphone 118, a speaker 120, a fingerprint reader 122, and a plurality of distance-detection sensors 116. In some embodiments, distance detection sensors include ultrasonic sensors. In some embodiments, distance detection sensors include LiDAR (light detection and ranging) modules. In some embodiments, distance detection sensors include infrared sensors. In some embodiments, distance detection sensors include optical flow sensors and/or dual camera optical sensors. Sensors on front side 106 are positioned such that the sensors interact with a user and/or a detection region in front of the front side as the luggage system travels on the ground. Luggage system 100 includes a display screen 114 to display written messages to a user, and speaker 120 to present recorded sounds to a user during operation of the luggage system.

A control system, e.g., luggage system control system 900 (FIG. 9), is connected to the various electronic components of Luggage system 100. The control system executes stored instructions for driving wheels 110. The control system further executes stored instructions for processing information received by Luggage system 100, such as information received by camera 112, microphone 118, fingerprint reader 122, distance detection sensors 116 and/or other electronic components of Luggage system 100. The control system further executes stored instructions for communicating with a user or others, such as by speaker 120, display screen 114 and/or other electronic components of Luggage system 100. In some embodiments, display screen 114 includes an LED screen configured to display images and/or text.

The luggage system 100 further includes a locking mechanism (not shown) configured to control access to an interior of the luggage system 100. When the locking mechanism is in an unlocked state, a user is able to access an interior of the luggage system 100 in order to insert or remove article(s) from the luggage system 100. When the locking mechanism is in a locked state, the user is unable to access the interior of the luggage system 100. In some embodiments, the locking mechanism is controlled by the control system based on information received by the luggage system 100. In some embodiments, at least one of the speaker 120 or the display screen 114 is configured to issue an alert in response to an attempt to improperly operate the locking mechanism, such as by an unauthorized user.

Figure 2:
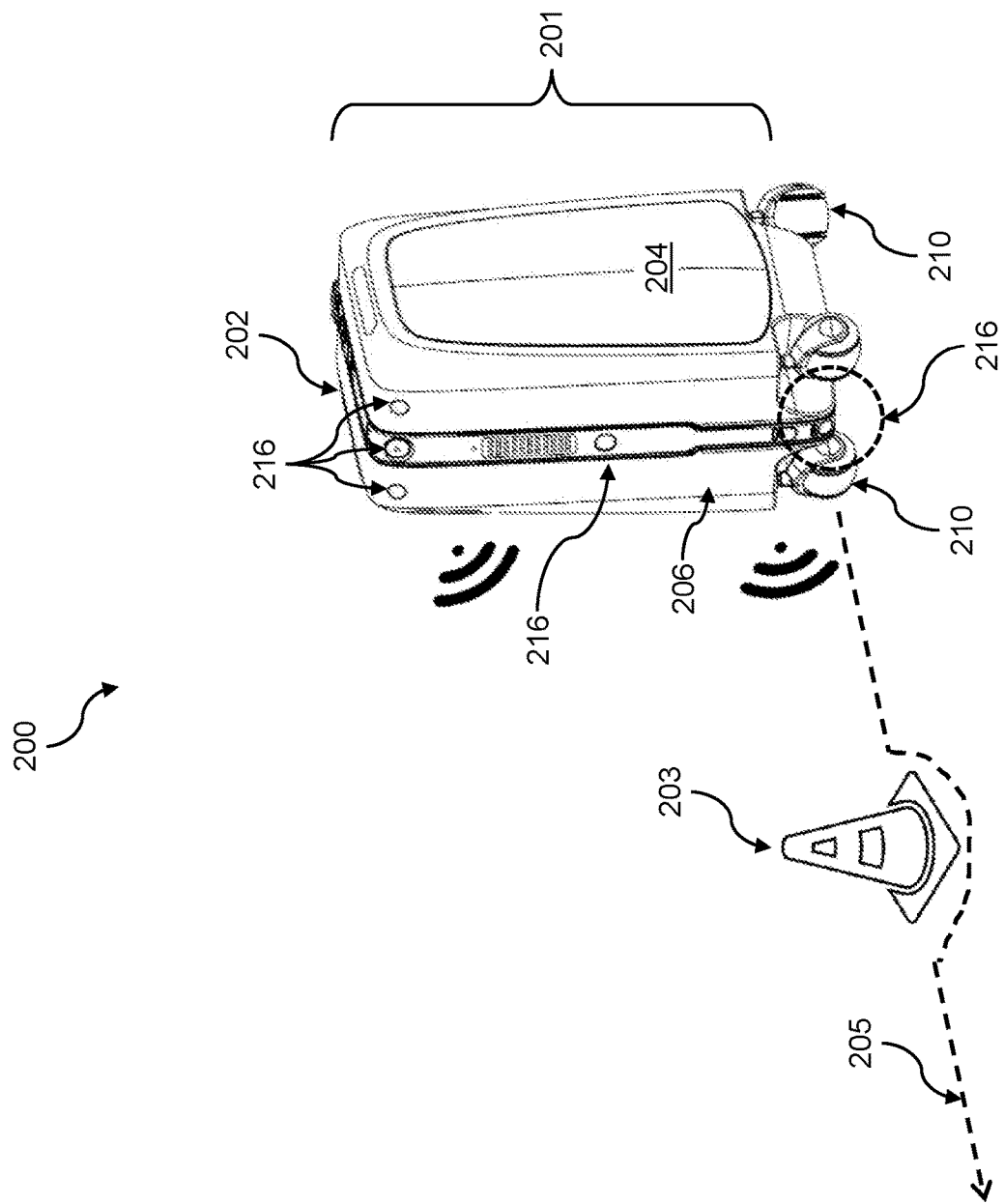
FIG. 2 is a diagram of a luggage system navigating around an obstacle on a path, according to some embodiments.

FIG. 2 is a diagram of a luggage system 200 navigating around an obstacle 203 along a path 205, according to some embodiments. Luggage system 200 is similar to luggage system 100 and same elements have a same reference number increased by 100. The control system, e.g., control system 900 (FIG. 9), is configured to control wheel 210 of luggage system 200 in order to propel the luggage system along path 205. The path is determined based on received instructions. For example, in some embodiments, the luggage system 200 receives instructions to move to a specific location and determines the path 205 from a current location to the specific location based on location and routing information, such as GPS information. In some embodiments, path 205 is determined based on instructions for luggage system 200 to follow a user. In some embodiments, a user interface on a luggage system is configured to receive an instruction from a user to select an operation mode of the luggage system. In some embodiments, the operation modes of a luggage system include a "people following" mode and an "item delivery" mode. In people following mode, the luggage system operates by remaining in a fixed distance from the user as the user moves, or remains stationary, in an area. In "item delivery" mode, the luggage system navigates from a sending user to a receiving user (a recipient) to convey an item in the luggage to the receiving user.

Luggage system 200 includes distance detecting sensors 216 on front side 206 of the vehicle body 201. Distance detection sensors 216 include, in some embodiments, one or more of LiDAR modules, infrared sensors, optical flow sensors, dual cameras, and/or ultrasonic sensors to determine a presence of obstacles such as obstacle 203 in front of luggage system 200 during operation. Wheels 210 at the bottom of vehicle body 201 are configured to propel, using a combination of battery power and a propulsion module having at least one motor (not shown), the luggage system forward. Further sensors and computing elements are configured to regulate individual wheel orientation, and/or wheel rotational velocity, to direct the luggage system along a path 205.

In response to distance detecting sensors 216 detecting an obstacle 203 along path 205, the control system of luggage system 200 adjusts path 205 to navigate around the obstacle to prevent the luggage system from striking the obstacle. In some embodiments, upon navigating around obstacle 203, the control system drives the wheels 210 to propel luggage system 200 long the previously established 205. In some embodiments, the control system, in response to the detection of an obstacle 203, changes the path 205 to a new path that avoids the obstacle 203. By avoiding obstacles, the luggage system avoids falling and damaging the luggage system and/or damaging the obstacle 203.

Distance detecting sensors 216 are also usable to detect sudden changes in elevation of a ground surrounding luggage system 200. For example, if the path 205 encounters stairs, distance detecting sensors 216 detect the presence of the stairs and the control system establishes a new path in order to convey the luggage system to the specified location. In some embodiments, in response to the control system being unable to determine a path that avoids obstacles, such as obstacle 203 and/or stairs, the luggage system 200 issues an alert to a user by speaker 120, display screen 114, a wirelessly transmitted message or another suitable alerting process.

Figure 3:
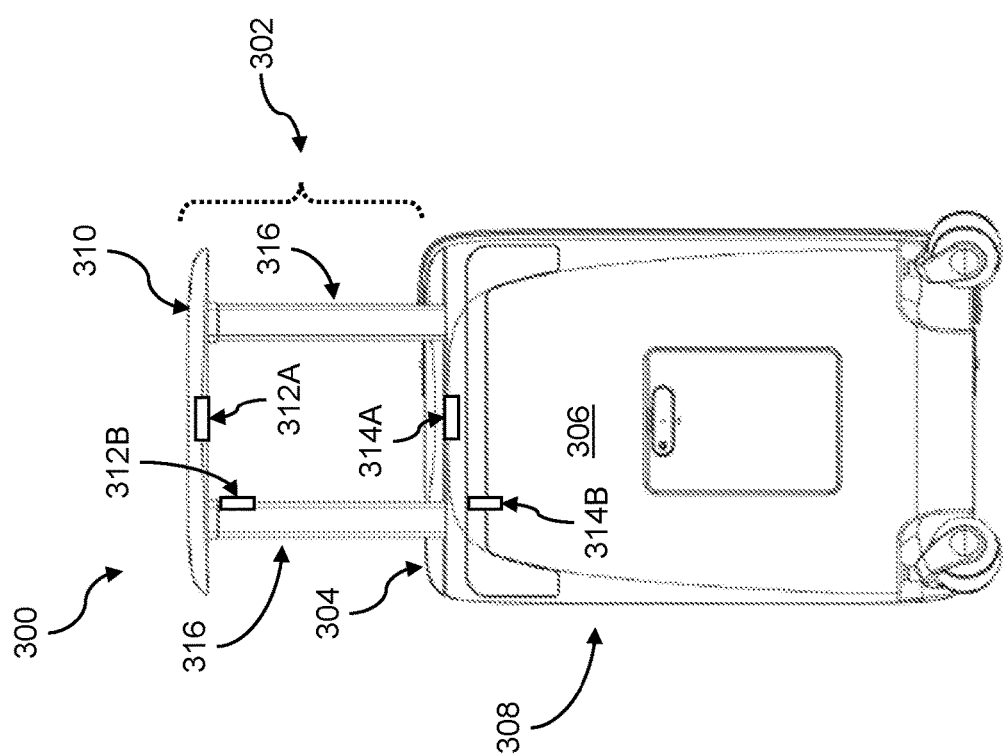
FIG. 3 is a diagram of a luggage system with an automation interrupt mechanism, according to some embodiments.

FIG. 3 is a schematic diagram of luggage system 300 in an open-handle position, with an automation interrupt mechanism, according to some embodiments. Luggage system 300 has a top side 304, from which handle 302 protrudes in extension, and into which handle 302 recesses in a closed position. Luggage system 300 has a handle side 306 and a front side 308. Handle 302 has a grip portion 310 and two arms 316. In some embodiments, handle 302 has one arm, or multiple arms, that are extend outward when a user grabs the grip portion 310.

During self-propelled operation of luggage system 300, a series of sensors and computing devices work in conjunction with a drive control circuit and a guidance module to steer and propel the luggage system 300 along a path toward a destination. In some embodiments, the luggage system 300 operates in a self-propelled mode when a handle 302 is in a lowered position (not shown). In some embodiments, the luggage system 300 interrupts self-propelled operating mode when a user triggers an automation interrupt mechanism by extending handle 302 and/or raising grip portion 310 above the luggage top side 304 (open position is shown). In some embodiments, the luggage system 300 interrupts self-propelled (or, item delivery) operating mode when a user triggers an automation interrupt mechanism by changing the height of a handle 302 and/or grip portion 310. In some instances, the automation interrupt mechanism is a handle height sensor. In some instances, the automation interrupt mechanism is triggered by raising the handle and/or grip portion. In some instances, the automation interrupt mechanism is triggered by lowering the handle and/or grip portion. Behavior of the automation interrupt mechanism is regulated using the luggage system control interface to match a user preference as to the initiation/termination of self-propelled or "item delivery" mode.

In some embodiments, the automation interrupt mechanism includes a Hall sensor 312A and a magnet 314A. When handle 302 is in a lowered position and the self-propelled mode is active, the Hall sensor 312A and the magnet 314A are sufficiently close that the magnetic field of the magnet 314A alters a current flow through the Hall sensor 312A. When the Hall sensor 312A in handle grip portion 310 is separated from magnet 314A, the magnetic influence of magnet 314A on Hall sensor 312A ends and a different electrical performance of the automation interrupt mechanism is detected by a central processing unit (not shown) of the luggage system 300. In some embodiments, the components of the automation interrupt mechanism are located on arms of the handle 302. In some embodiments, Hall sensor 312B is located at an upper position on the handle arm 316, and magnet 314B is situated in handle side 306 to be in proximity to Hall sensor 312B to modify operation of the Hall sensor 312b when the handle 302 is in a closed position (not shown). When the handle 302 is in an open position, as in FIG. 3, the drive control circuit (not shown) in luggage system 300 interrupts operation of drive motors and wheels of the luggage system, bring the system to a halt. Interrupting the self-propelled mode of luggage system 300 also, in some embodiments, turns sensors on front side 308 into an "off" state to reduce electrical power consumption until a self-propelled mode (automation) is re-initiated.

The automatic interrupt mechanism of luggage system 300 is usable with luggage system 100 and/or with luggage system 200.

Figure 4:
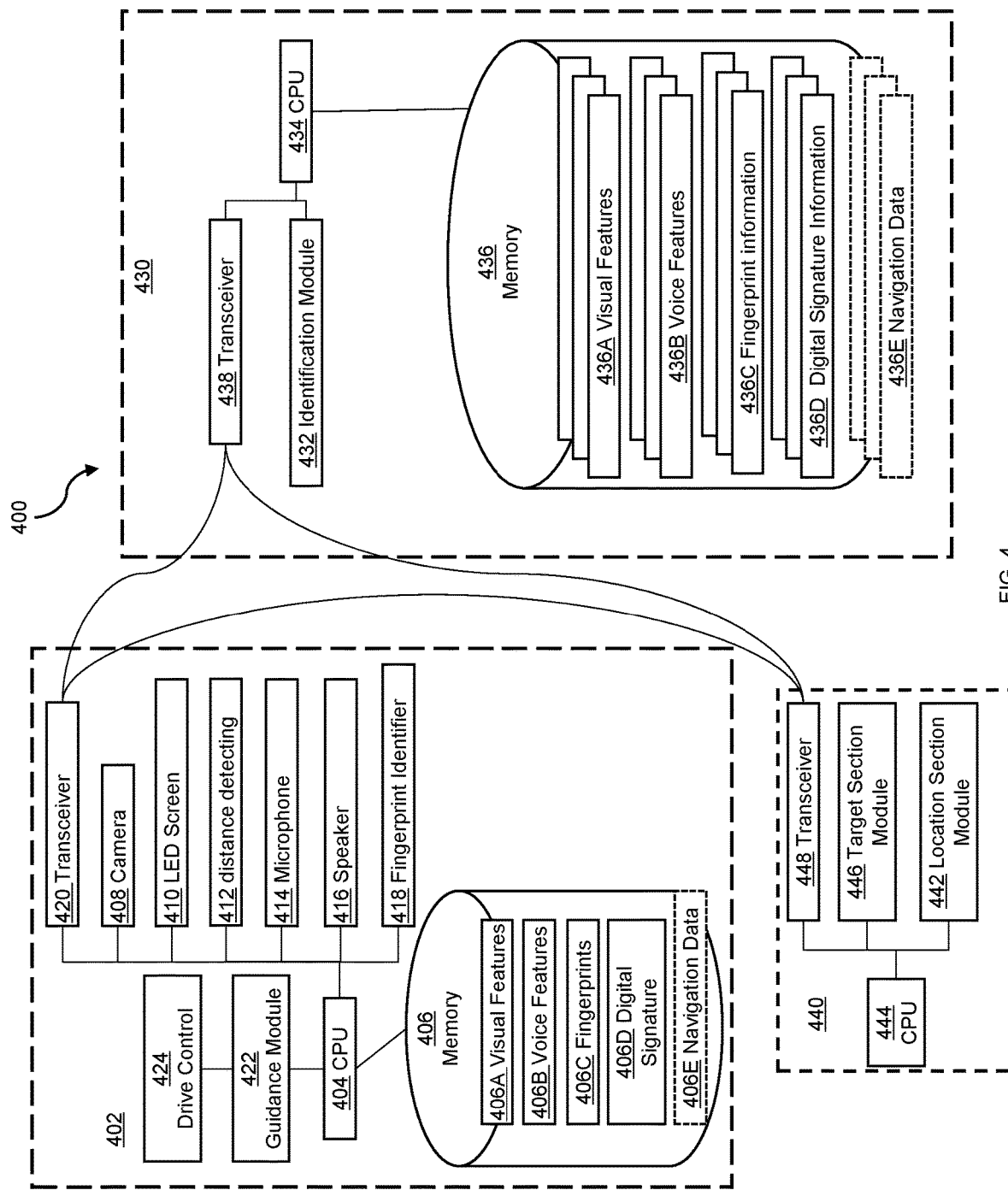
FIG. 4 is a schematic diagram of a luggage system control circuit according to some embodiments.

FIG. 4 is a schematic diagram of an automated luggage delivery control system 400, according to some embodiments. Luggage control system 400 includes a mobile luggage module 402 (e.g., the vehicle body, battery, central processing unit, sensors, control boards, guidance module, drive control circuit, and so forth, not shown), a remote computing device 430, and a system control module 440. The mobile luggage module 402, remote computer device 430 and system control module 440 are in communication with each other by transceivers and/or by a wired connection.

Mobile luggage module 402 includes a luggage central processing unit (luggage CPU) 404, a digital storage medium 406 (e.g., a memory), a luggage transceiver 420 configured to communicate with other transceivers in automated luggage delivery control circuit 400, and a plurality of environmental interaction elements such as sensors and/or communication modules. Sensors in mobile luggage module 402 include, but are not limited to, one or more cameras 408, a distance detecting module 410, a microphone 414, a speaker 416 and a fingerprint identifier 418. In some embodiments, distance detection module 410 includes sensors such as ultrasonic sensors LiDAR (light detection and ranging) modules, infrared sensors optical flow sensors, and/or dual camera optical sensors. In some embodiments, distance detecting module 410 also includes signal emitters configured to generate signals that are received by one or more sensors in the distance detecting module 410.

Digital storage medium 406 is configured to store and to retrieve instructions for execution by CPU 404 for operating the luggage system as well as identifying and verification information related to locating and/or identifying a user. Digital storage medium 406 is configured to receive, retain, and to retrieve visual features 406A, voice features 406B, fingerprint features 406C, digital signature information 406D (stored on a user-retained digital device for user identification after self-propelled luggage locates and moves toward the user), and navigation information 406E, among other information types. In some embodiments, the navigation information 406E is usable to determine a path, e.g., path 205 (FIG. 2), for the luggage system to travel to a specific location. In some embodiments, CPU 404 is configured to lock/unlock a locking mechanism of the luggage system based on a comparison of received data with the identifying and verification information stored in digital storage medium 406.

Mobile luggage module 402 further includes a guidance module 422 and a drive control circuit 424. The guidance module 422 is configured to communicate with central processing unit 404 and memory 406 for determining a present location of the luggage system and a position of a location specified by a user. Drive control circuit 424 is configured to control wheels of the luggage system, e.g., wheels 110 or 210 (FIGS. 1 and 2).

Automated luggage delivery control system 400 includes a remote computing device 430, having a remote central processing unit (remote CPU) 434 connected to at least a remote transceiver 438, an identification module 432, and a remote device memory 436. Like memory 406 in the mobile luggage module, remote device memory 436 is configured to store and retrieve visual feature information 436A, voice feature information 436B, fingerprint information 436C, digital signature information 436D, and/or navigation data 436E, and so forth. Remote device memory 436 is configured to hold such information for multiple users of a luggage system to promote ease of use for the luggage operator and/or recipient. Navigation data 436E includes information related to a current position of the luggage system as well as map data for an area surrounding the current position of the luggage system. In some embodiments, remote CPU 434 is a server configured to provide information to multiple luggage systems. In some embodiments, remote CPU 434 is a mobile terminal, such as a smart phone. In some embodiments, remote CPU 434 is a wearable electronic device, such as a smart watch. In some embodiments, the automated luggage system directs itself to a coordinate identifying a destination using previously downloaded map data. In some embodiments, the automated luggage system requests and receives downloaded map data subsequent to receiving a command to delivery an item to a destination. In some embodiments, the luggage system delivers the items loaded in the luggage system body by navigating point to point without map data, and scans for potential recipients during an entire course of travel to find the intended recipient. In some instances, the luggage system employs the luggage system user interface to request identifying information from potential or intended recipients. In some instances, the luggage system user interface provides a visual indicator of the intended recipient. In some instances, the luggage system user interface provides an audible indicator (or, an announcement) of the intended recipient. In some instances, the luggage system user interface is configured accept a visual image of the potential recipient. In some instances the luggage system user interface is configured to accept an audible indicator of the potential recipient identity. In some instances, the luggage system user interface is configured to accept biometric indicators of recipient identity.

Automated luggage delivery control system 400 further includes a luggage circuit operating module 440, comprising an operating CPU 444, an operating module transceiver 448, a target selection module 446, and a location selection module 442. Operating module transceiver 448 is configured to communicate with remote device transceiver 438. Remote device transceiver 438 is configured to communicate with all transceivers in the automated luggage delivery control circuit 400, including luggage transceiver 420, to share user identity information, and user verification information, among the control circuit components. By sharing user identity information (e.g., information received from a user after a mobile luggage module 402 locates and approaches a designated luggage recipient, or receiving user), and user verification information (information stored on remote computing device 430 and/or luggage circuit operating module 444 to verify that the actual luggage recipient is the designated luggage recipient, or receiving user), luggage contents are made more secure and more difficult to lose due to improper delivery or loss.

Target selection module 446 is configured to identify, either by a stored record or by a created record with the luggage control system 400, a receiving user of the mobile luggage module 402. In some embodiments, the receiving user is a same user as a sending user. In some embodiments, the receiving user is different from the sending user. The luggage circuit operating module 440 is further configured to transmit, either directly to the mobile luggage module transceiver 420, or via the remote computing device transceiver 438, navigation information associated with a location of a receiving user, or of a final luggage destination. In some embodiments, the receiving user is located at another position within a transportation hub facility. In some embodiments, a final luggage destination is a station for handling and/or storing luggage delivered by sending users. In some embodiments, location selection module 442 directs a remote memory to convey, to a mobile luggage module 402, a map of a transportation facility. In some embodiments, location selection module 442 directs a remote memory to convey instructions on requesting a set of navigation data from a remote memory to the mobile module transceiver 420.

Figure 5:
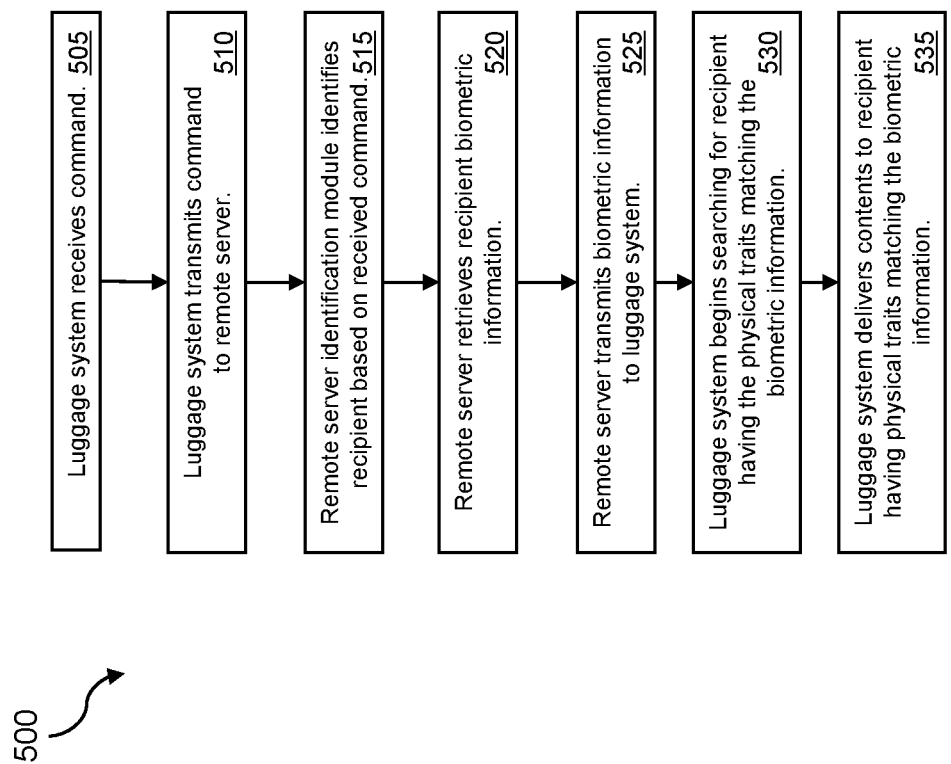
FIG. 5 is a flow diagram of a method of using a luggage system, according to some embodiments.

FIG. 5 is a flow diagram of a method 500 of using an automated luggage delivery system, according to some embodiments. Method 500 includes operation 505 in which a user sends a command to the automated system. In some embodiments, the command is a verbal command directed toward a microphone located in the vehicle body. In some embodiments, the command is a computer-generated command provided on a user control module that is electrically/communicatively coupled to the smart luggage. In some embodiments, the command is transmitted wirelessly to the luggage system by a remote terminal, such as a smart phone, smart watch or other suitable remote terminal. In some embodiments, the command is an instruction to find a recipient of items contained in the luggage system. In some embodiments, the command includes an identifier of the recipient of items contained in the luggage system. In some embodiments, the command is a photograph of the recipient. In some embodiments, the photograph is provided to the luggage system at the time the instruction is sent. In some embodiments, the photograph is provided prior to giving the instruction to the luggage system. In some embodiments, the identifying information includes clothing worn by the recipient.

Method 500 includes an operation 510, where the automated luggage system transmits the command to a remote computing device (e.g., a remote server) for analysis. In some embodiments, the analysis includes verification of the received command, a request for location information or other suitable analysis of the received command. In some embodiments, the command is received and processed locally without resorting to communicating to a remote server or remote computing device, basing user identification on information already stored on the luggage system. In some embodiments, the luggage system, after receiving a command to deliver an item, requests the user to provide identifying information regarding the luggage recipient prior to initiating travel to find the recipient.

Method 500 includes operation 515, where the identification module on a remote server identifies a receiving user according to the content of the received command. In some embodiments, the receiving user is designated by the sending user using the remote terminal. In some embodiments, the receiving user is a user determined by the remote server. In some embodiments, the remote server determines the receiving user based on security regulations or other requirements for the location (airport, train station, etc.) at which the luggage system is positioned.

In an operation 520, the remote server identifies, in a computer memory on the remote server, at least one piece of verification information that is used to verify the actual receiving user of the luggage system is the intended and/or designated receiving user identified in operation 515. In some embodiments, the verifying information is physiological information associated with the user. Physiological or biometric information associated with the user includes, in some embodiments, one or more of facial information, skin pattern information (freckles, fingerprints), and so forth. In some embodiments, the verifying information is a digital key or a digital signature stored on the remote server. In some embodiments, the digital information is part of an encrypted key pair that securely verifies a receiving user without compromising the digital key or digital signature. In some instances, the verifying information is a pattern of clothing stored on the remote server by the recipient prior one or more of operations 505-515.

In an operation 525, the remote server communicates the verifying information back to the luggage system and/or the luggage control module. In some embodiments, the verifying information includes a digital key, facial recognition information, fingerprint information, voice recognition and/or other suitable identifying information. In some embodiments, the remote server communicates all available verifying information to the automated luggage delivery system. In some embodiments, the remote server communicates less than all of the available verifying information to the smart luggage. In some embodiments, the remote server determines which verifying information to communicate to the smart luggage based on a type of verifying information specified by the sending user.

In an operation 530, the smart luggage self-propels toward a receiving user based on navigation information and/or location information received by the mobile luggage module from one or more of the remote server and/or the control module. In some embodiments, a processing unit, such as CPU 404, determines a path from a current location of the luggage system to a user. During operation 530, the luggage system avoids obstacles, e.g., obstacle 203 (FIG. 2).

In an operation 530, the automated luggage delivery system further performs an identifying process to find the receiving user based on the verifying information. In some embodiments, identifying a receiving user is performed by broadcasting a digital code requesting a digital key or digital signature associated with the receiving user from a user-retained electronic device. In some embodiments, the luggage performs the identifying step based on image recognition of the user, voice recognition, fingerprint recognition and/or other suitable identifying processes. In some embodiments, the luggage performs more than one identifying process. In some embodiments, the automated luggage system performs the identifying process once the luggage system is within a predetermined distance from the location specified by the sending user. By minimizing the processes performed during movement of the luggage system, a battery life of the luggage system is prolonged. In some embodiments, if the luggage system is unable to identify the receiving user within a predetermined time frame following arrival at the location specified by the sending user, the luggage system transmits an alert message to the sending user, the remote server and/or the receiving user.

In an operation 535, upon identifying the receiving user, the luggage system unlocks the locking mechanism in the vehicle body and provides one or more of the receiving user and the sending user a message indicating that the receiving user has been found and the luggage contents delivered. In some embodiments, the luggage system prompts the receiving user for the type of identifying information requested for unlocking the locking mechanism.

In some embodiments, additional operations are performed during method 500. In some embodiments, an order of operations of method 500 is changed. In some embodiments, at least one operation of method 500 is combined with another operation or omitted.

Figure 6:
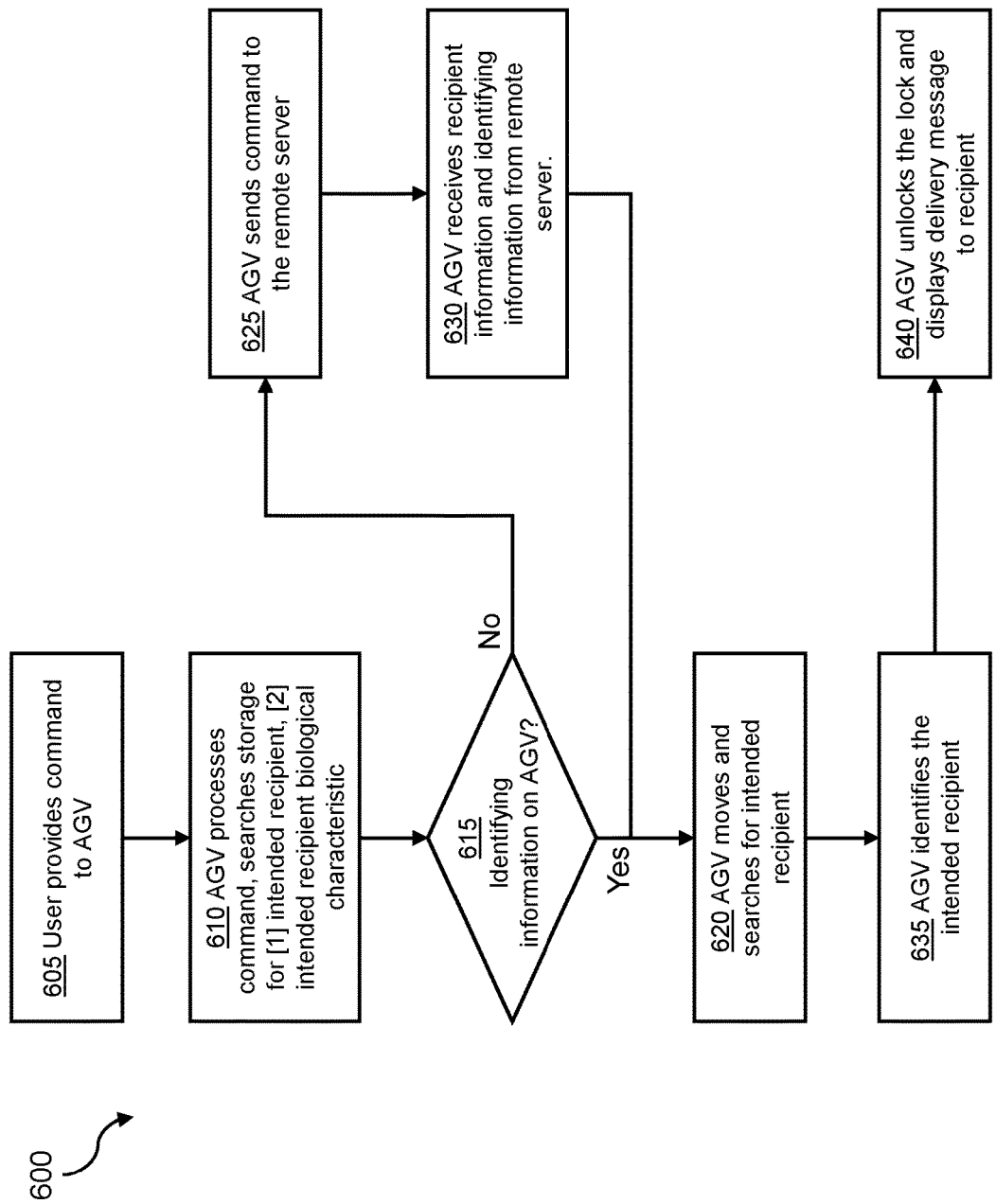
FIG. 6 is a flow diagram of a method of operating a luggage system, according to some embodiments.

FIG. 6 is a flow diagram of a method 600 of operating an automated luggage delivery system, according to some embodiments. Method 600 includes an operation 605, in which a user provides a command to an automated luggage delivery system. The command provided to the automated system includes, in some embodiments, a vocal command, a typed command, a command electronically transmitted from a control unit, a command electronically committed from a mobile device running a software application, or a command programmed into the luggage system and activated upon depressing a switch on the luggage system body.

Figure 10:
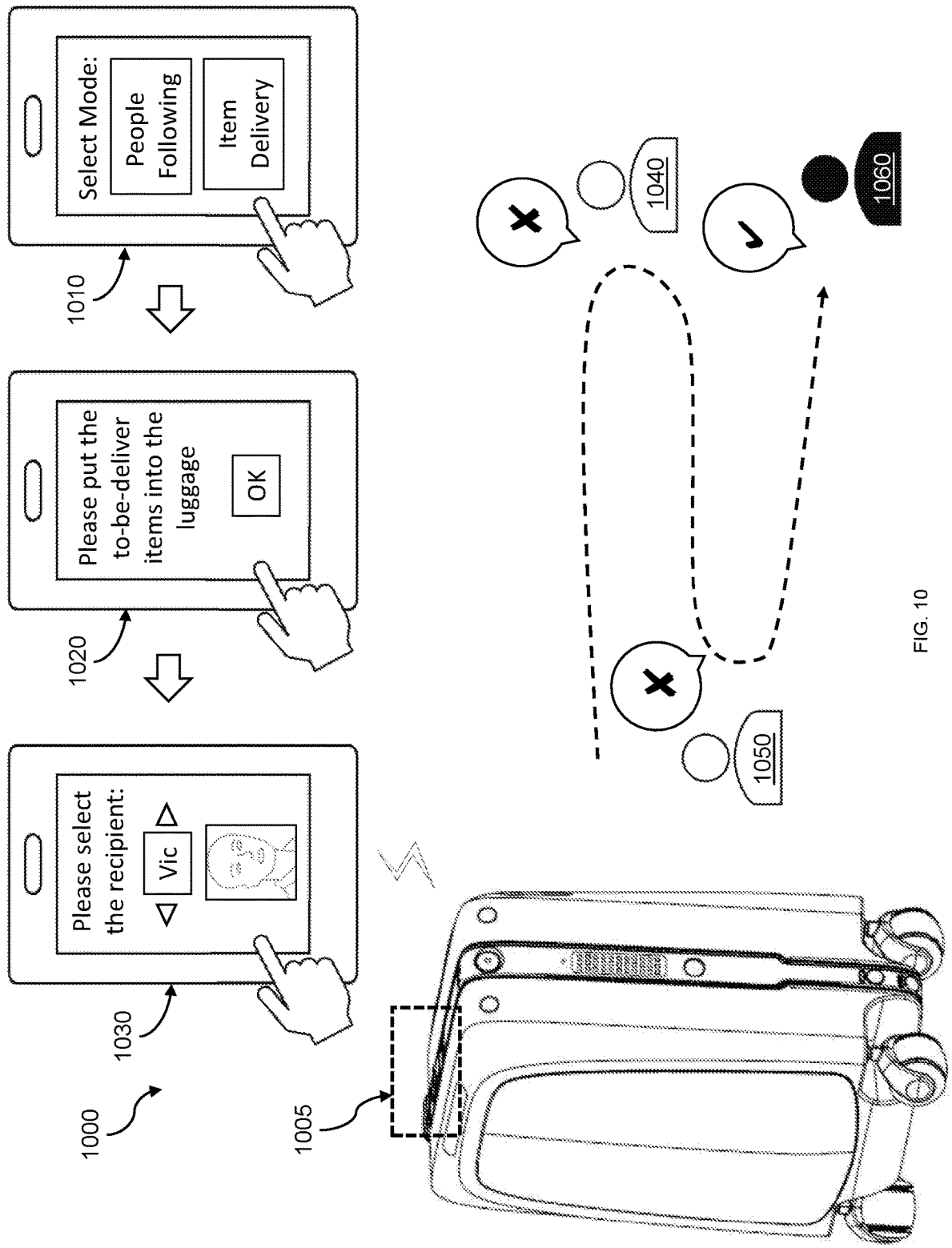
FIG. 10 is a graphical representation of a series of views of a luggage system user interface, according to some embodiments.

Method 600 includes an operation 610, in which an automated luggage delivery system, having received the command, processes said command and searches an internal storage device for information. The information searched in operation 610 includes, identification information or an identity of an intended recipient of the luggage system (e.g., the person to whom the luggage system will convey the contents located therein), and/or identifying information associated with the intended recipient of the luggage system contents. In some instances, identifying information includes biometric information associated with an intended recipient, a passcode or personal identification number known to the intended recipient, or a security key possessed by the intended recipient. Biometric information associated with the intended recipient includes facial recognition information, fingerprint information, retinal information, iris pattern information, and/or skin pattern information such as tattoos, freckles, or other skin color variations. A passcode or personal identification number known to an intended recipient includes, in some embodiments, a series of alphanumeric or other characters known to a recipient and capable of being entered into an automated luggage delivery system user interface. Entry, by a user, into an automated luggage delivery system user interface includes entry by speaking and/or typing the passcode or personal identification number. FIG. 10 is a graphical representation 1000 of a series of views of a luggage system user interface 1005 prior to delivering an item to an intended recipient. User interface view 1010 is a non-limiting representation of a luggage system user interface wherein a user selects an operational mode of the luggage. In some embodiments, the luggage system allows a user to select between directing the luggage system to follow the user, or to deliver an item to a recipient. User interface view 1020 is a graphical representation an embodiment of the luggage system user interface directing a user to place a deliverable item in the luggage system after selecting an "item delivery" operating mode. User interface view 1030 is a graphical representation of an embodiment of a luggage system user interface wherein the user is prompted to select an intended recipient of the item to be delivered by the luggage. Subsequent to selecting an operating mode of the luggage system, placing the delivered object within the luggage system body, and selecting an intended recipient, the luggage system initiates self-navigation and self-propelled mode to find the intended recipient. A luggage system in "item delivery" mode interacts with one or more potential recipients 1040, 1050, before finding an intended recipient 1060 and delivering the item in the luggage body after recipient verification. Recipient verification uses one or more user interface components to receive information from the potential recipient and verify the recipient identity. In some instances, a security key possessed by the intended recipient includes an encryption key, a digital signature, or some other electronically stored identifier that can be transmitted to and luggage system control circuit to verify that a person is the intended recipient of the luggage delivery system and contents thereof.

Method 600 includes an operation 615, in which the automated luggage delivery system determines whether or not identifying information associated with the intended recipient is located in a storage medium of the luggage system. When the identifying information is not located in a storage medium of the luggage system, method 600 proceeds to operation 625. When the identifying information is located in a storage medium of the luggage system, method 600 proceeds to operation 620.

In operation 620, subsequent to determining that identifying information associated with the intended recipient is located in a storage medium of the luggage system, the luggage system commences moving and searching for the intended recipient. In some embodiments, the luggage system moves toward a location specified by a sending user. In some embodiments, the luggage system moves toward most recent location of the receiving user known by the luggage system. In some embodiments, the luggage system performs a search for the receiving user based on a search algorithm stored in the storage medium of the luggage system.

In operation 625, the luggage system transmits a command to a remote server to request identifying information associated with an intended recipient of the luggage system and the contents thereof. In some embodiments, the luggage system requests all identifying information associated with the intended recipient of the luggage system. In some embodiments, the luggage system requests less than all of the identifying information associated with the intended recipient. In some embodiments, the luggage system requests only the identifying information usable to unlock a locking mechanism of the luggage system.

Subsequent to operation 625, method 600 includes an operation 630, in which the luggage system receives identifying information associated with an intended recipient, and the method continues in operation 620, as described above.

Method 600 includes an operation 635 in which the luggage system identifies the intended recipient. In some instances, identifying the intended recipient includes steps associated with biometric identification of a user, steps associated with requesting and receiving a pass code or personal identification number, and/or steps associated with requesting and receiving an encryption key or other electronically stored identifying code linked with the intended recipient. In some instances, identifying the intended recipient includes operations associated with detecting proximity of the luggage system to the intended recipient, requesting that the intended recipient provide the luggage system with verifying information to confirm that the identified recipient is the intended recipient identified to the luggage system in operations 605 through 630, and steps associated with requesting biometric information associated with an intended recipient. In some embodiments, requesting biometric information includes prompting an intended recipient to provide biometric information using an interface device on the luggage system. An interface device includes a screen on the luggage system body configured to present a written message or visual prompt to the identified person, a visual indicator attracting the attention of the identified person to a sensor on the luggage system body configured to receive verifying biometric information, and/or a camera system configured to visually identify a person by facial recognition or some other visual identifying technique.

In some instances, the luggage system prompts and identified recipient using a luggage system user interface to type or speak a passcode, personal identification number, or other access code to the luggage system for recipient verification purposes. In some instances, a luggage system transmits a request for verifying information from and identified recipient using near field communication, Bluetooth communication format, or Wi-Fi communication format methods in order to interface with an electronic device in possession of an intended recipient and prompt the electronic device in possession of the intended recipient to transmit a digital signature or verifying code to the luggage system to verify that and identified recipient is the intended recipient.

In some embodiments, the luggage system detects objects located near, or in the direction of travel, of the luggage system to promote navigation of the luggage system through a space toward a recipient location. In some instances, the luggage system navigates point to point without an externally provide, or internally stored map. In some instances, the luggage system navigates point to point searching for an intended recipient without a map of the area. Searching or navigating includes at least access to map information associated with the space where the luggage system is located and/or access to a positioning system by which the luggage system can track a location of the luggage system and a location of an intended recipient during navigation and search functions. In some instances, luggage system searching and navigation is performed using coordinate-based identifiers for the luggage system location and recipient location. In some instances, luggage system searching and navigation is performed using dead reckoning methods, wherein inertial measurements are used in combination with acceleration information provided by the luggage system drive control system and/or wheel movement and orientation sensors to track and calculate relative positioning of the luggage system with respect to an original position of the luggage system. In some instances, luggage system position is determined and are calculated using RF-based transmitters in a space. RF-based transmitters include, in some embodiments, Wi-Fi and/or Bluetooth transmitters. In some embodiments, physical locations of Wi-Fi and/or Bluetooth transmitters in a space are known to the luggage system prior to commencement of search and navigation functions. In some embodiments, physical locations of Wi-Fi and/or Bluetooth transmitters are not known, but are dynamically determined using signal strength measurements during search and navigation functions. In some instances, navigation through space is accomplished by sequentially identifying and approaching a series of RF-based transmitters in a space to map out a space and determine whether persons near to RF-based transmitters are the intended recipient.

The method continues in an operation 640, wherein the luggage system unlocks the luggage system body to provide the intended recipient access to the contents thereof, and transmits a message indicating that the intended recipient has been located and received access to the contents of the luggage system. In some instances, unlocking the luggage system body is performed according to a software command stored in a storage medium of the luggage system control circuit subsequent to prompting and identified recipient for verifying information and comparing the verifying information to identifying information associated with an intended recipient received from a user and or a remote server or storage device prior to searching and navigation functions.

In some embodiments, additional operations are performed during method 600. In some embodiments, an order of operations of method 600 is changed. In some embodiments, at least one operation of method 600 is combined with another operation or omitted.

Figure 7:
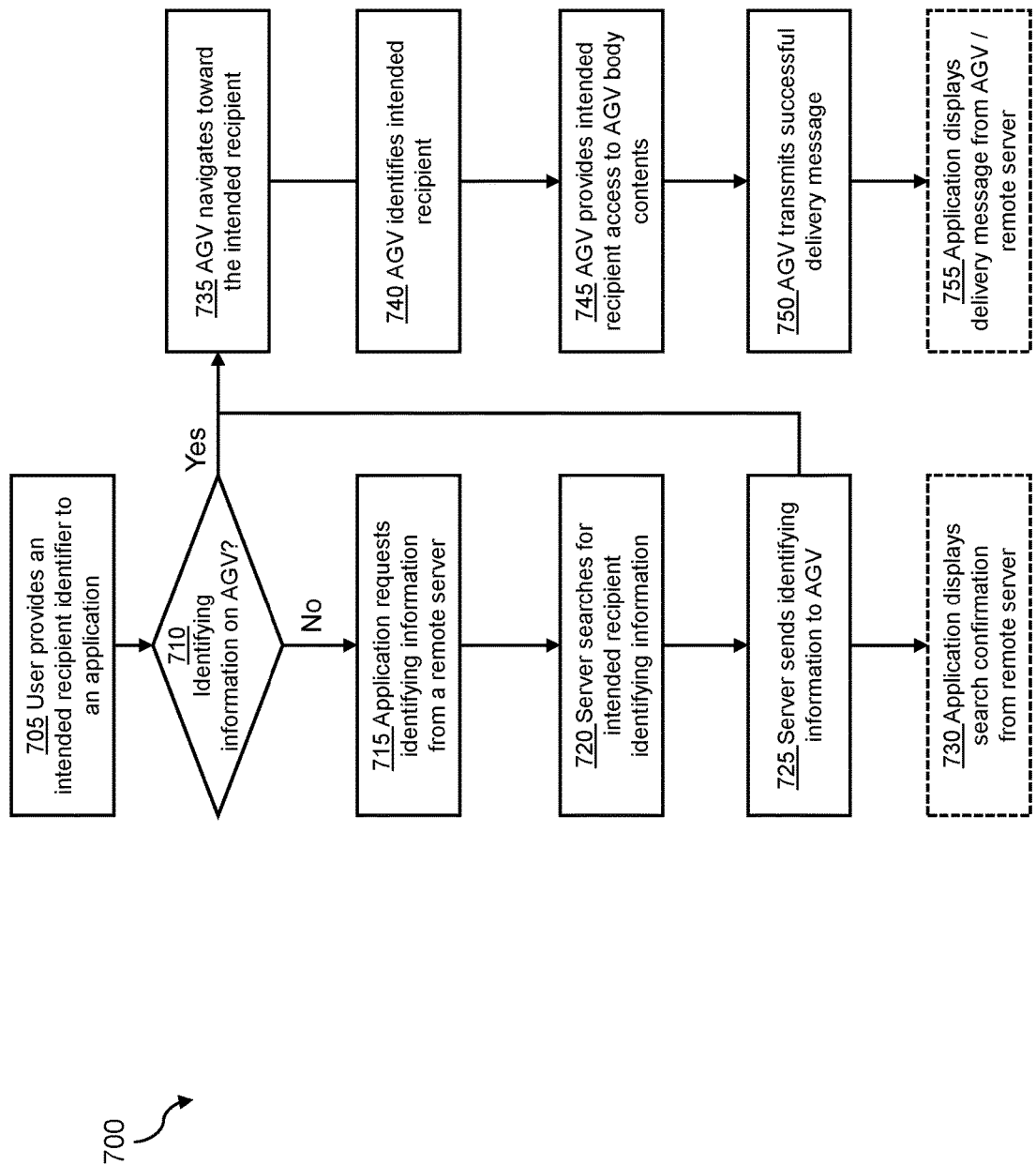
FIG. 7 is a flow diagram of a method of using a luggage system, according to some embodiments.

FIG. 7 is a flow diagram of a method 700 of using a luggage system, according to some embodiments. Method 700 includes similar operations as those described in method 500 and in method 600, for the sake of brevity detailed description of these operations are not repeated here. Method 700 includes an operation 705, in which user provides an intended recipient identifier to a software application running on a control device in the possession of a luggage system user. In some embodiments, a software application running on the control device is a software application installed on a dedicated hardware unit in electronic communication with a luggage system control circuit. In some instances, a software application is installed on a user-provided hardware devices such as a tablet, smart phone, or other electronic device capable of receiving tight and/or spoken commands and communicating said commands to at least one of a luggage system control circuit and/or a remote server. In some instances, a software application includes identifying information associated with one or more intended recipients. In some instances, a software application is capable of recording identifying information associated with one or more intended recipients and transmitting said identifying information to a remote server. In some embodiments, a remote server is capable of receiving identifying information from an intended recipient without involvement of a user and or a software application running on a hardware unit in possession of a luggage system user.

Method 700 includes an operation 710, in which a luggage system control circuit determines whether or not identifying information associated with an intended recipient is located on a storage device in the luggage system control circuit. In some instances, determining whether the identifying information is located on the luggage system further comprises using an intended recipient identifier to search a storage medium in the luggage system control circuit to determine whether the intended recipient identifier is stored in the luggage system control circuit and/or is associated with any identifying information associated with delivery recipients. When identifying information associated with an intended recipient is located on a storage device in the luggage system control circuit, the method continues in an operation 750. Operation 750 is similar to operation 620 in method 600.

When identifying information associated with an intended recipient is not located on a storage device in the luggage system control circuit, the method continues to operation

715. In operation 715, a software application transmits a request for identifying information associated with an intended recipient to a remote server. In some instances, a remote server includes biometric, electronic, or passcode type identifying information associated with an intended recipient of a luggage system delivery. The method continues in operation 720, in which the server searches a storage medium for one or more types of intended recipient identifying information. In some instances, the storage medium is included as part of a remote server. In some embodiments, the storage medium is connected to a remote server by a communication cable or by a wireless RF signal.

After searching for the identifying information, the remote server accesses the identifying information associated with an intended recipient of a luggage system delivery. The method continues in an operation 725 wherein the server sends the identifying information to the luggage system control circuit for use during a navigation and search process to find and identify an intended recipient from among one or more possible identified recipients of the luggage system. In some instances of operation 725, the remote server further transmits a signal to the application indicating that the identifying information has been found and/or accessed.

The method further contains an optional operation 730, in which the application displays a search confirmation signal from the remote server to the application user.

In some instances, method 700 proceeds from operation 725 to operation 735, wherein, based on the identifying information received at the luggage system, the luggage system navigates through a space toward an intended user to deliver the luggage system and the contents therein to the intended user. In some instances, the method proceeds from operation 735 to operation 740. In operation 740, the luggage system identifies the intended recipient using one or more sensors located on the luggage system body, as depicted in FIG. 1, and/or a user-provided identifier such as a passcode or a personal identification number (PIN) entered into a luggage system control circuit using a user interface. In some instances, the user interface includes a touch screen, in some instances the user interface includes a keyboard or keypad, in some instances the user interface includes a camera, and in some instances the user interface includes a speaker and microphone combination configured to present and receive audio communication between a luggage system control circuit and an identified recipient.

Upon confirmation that the identified recipient has presented verifying information to the luggage system control circuit using one or more sensors and/or interface devices, the identified recipient is verified as the intended recipient and the method continues in operation 745, wherein the luggage system provides access to the luggage system body or contents to the identified user.

In some instances, performance of operation 745 is followed by an operation 750 in which the luggage system transmits a message that the luggage system contents have been delivered to at least one of the remote server and the application.

In some embodiments, the method 700 continues to an optional operation 755, in which the application displays to a user of the luggage system, that the luggage system contents have been successfully delivered. In some instances, the application receives the successful delivery message directly from the luggage system. In some embodiments, the application receives the successful delivery message from the remote server after the remote server receives the message.

In some embodiments, additional operations are performed during method 700. In some embodiments, an order of operations of method 700 is changed. In some embodiments, at least one operation of method 700 is combined with another operation or omitted.

Figure 8:
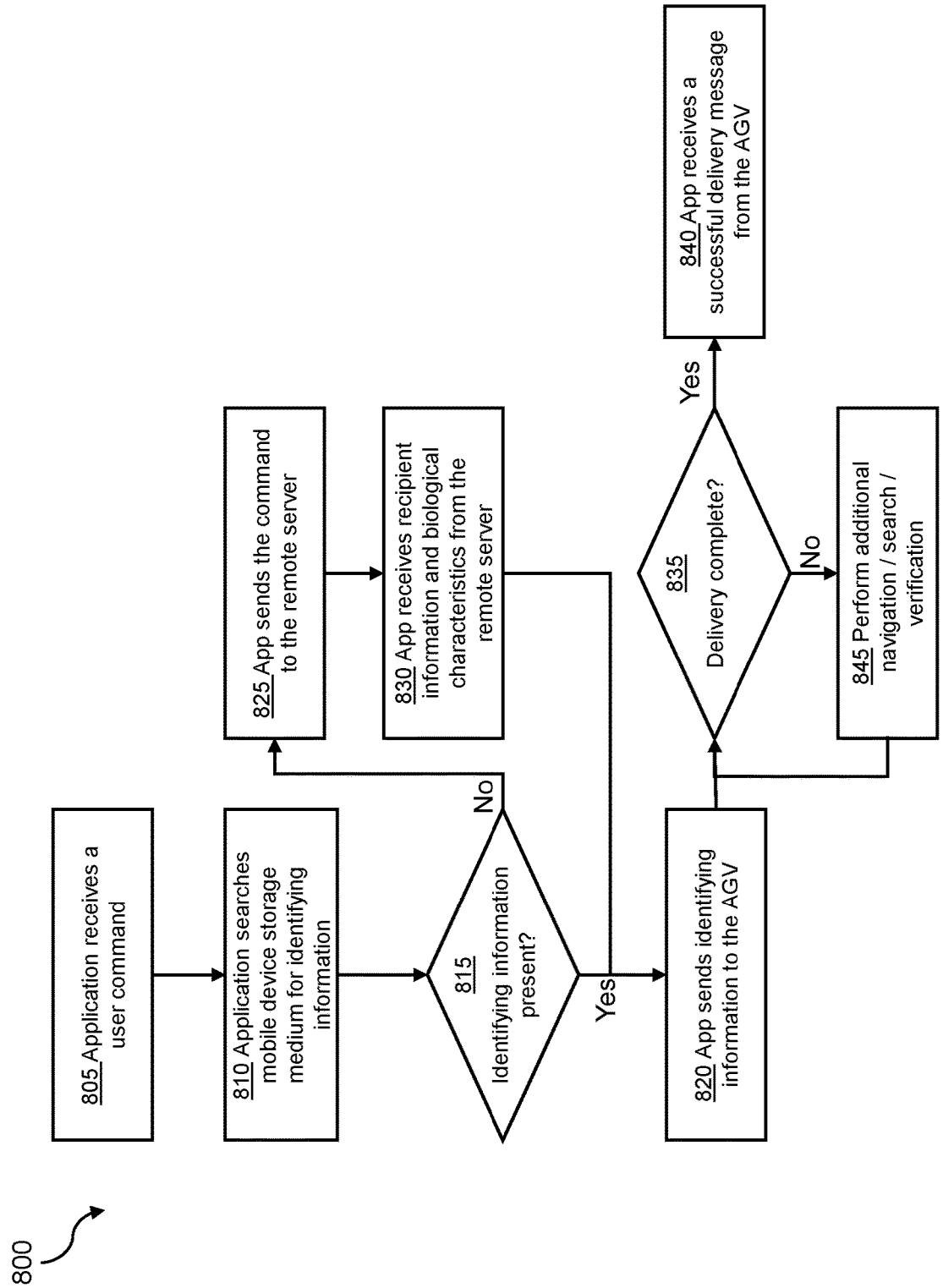
FIG. 8 is flow diagram of a method of using a luggage system, according to some embodiments.

FIG. 8 is flow diagram of a method 800 of using a luggage system, according to some embodiments. Method 800 includes similar operations as those described in method 500 and in method 600, for the sake of brevity detailed description of these operations are not repeated here. The method 800 includes an operation 805 wherein a software application running on a mobile device receives a command from a user to convey the luggage system to an intended user. In some embodiments, the mobile device is a computer tablet or laptop computer. In some embodiments, the mobile device is a smartphone or other computing device. In some instances, the user command is a typed command. In some embodiments of operation 805, the user command is a spoken command parsed by the mobile device and/or a remote server that receives an audio file containing the spoken command, translates an audio file into a textual command, and transmits the textual command to the mobile device for operation. In some instances, the user command includes a destination where the luggage system is directed to deliver the contents of the luggage system. In some instances, the user command includes a recipient identifier associated with the intended recipient. In some embodiments of operation 805, user commands include both a location and a recipient identifier.

Method 800 continues in an operation 810, wherein the application running on the mobile device searches a storage medium for identifying information associated with the recipient identifier received in the user command. In some embodiments of operation 810, the identifying information includes one or more of biometric information, a digital security key possessed by an intended recipient, and an identifier code possessed by the intended recipient. IN some instances, the identifier code is a passcode, password, or a personal identification number (PIN).

In operation 815, the application determines whether the identifying information is present in the storage medium of the mobile device where the application is running.

When the identifying information is present on the mobile device, the method proceeds to operation 820, where the identifying information is transmitted to a storage medium in the luggage system control circuit.

When the identifying information is not present on the mobile device, the method proceeds to operation 825, where the application transmits a request for the identifying information associated with the recipient identifier of operation 805 to a remote server for subsequent download.

Method 800 continues in operation 830, where the application receives identifying information from a remote server before continuing to operation 820.

The method 800 continues from operation 820 to operation 835, where the luggage system determines whether a luggage system delivery is complete.

When the delivery is not complete, the method continues to operation 845 in which search, navigation, and identification steps directed toward moving the luggage system closer to the intended recipient, When the delivery is complete, the method continues in operation 840 wherein the luggage system transmits to the application a delivery complete message for display to a user of the application.

In some embodiments, additional operations are performed during method 800. In some embodiments, an order of operations of method 800 is changed. In some embodiments, at least one operation of method 800 is combined with another operation or omitted.

Figure 9:
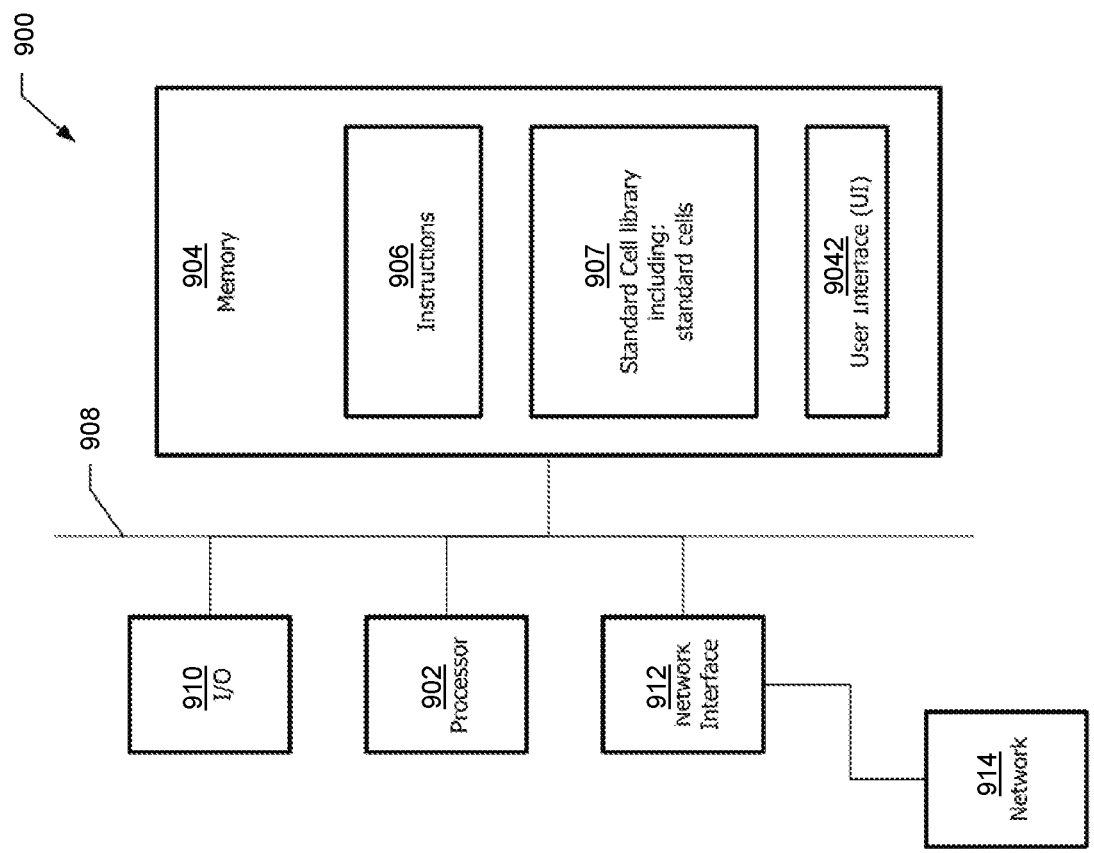
FIG. 9 is a schematic view of a system for controlling movement of a luggage system according to some embodiments.

FIG. 9 is a block diagram of a luggage system control system 900, in accordance with some embodiments. Methods described herein of generating cell layout diagrams, in accordance with one or more embodiments, are implementable, for example, using a luggage system control system 900, in accordance with some embodiments. In some embodiments, luggage system control system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) a luggage system control tool which implements a portion or all of, e.g., the methods described herein in accordance with one or more (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the luggage system control tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein.

Luggage system control system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

Luggage system control system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. Luggage system control system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of a luggage system control tool. In some embodiments, a portion or all of the noted processes and/or methods is implemented as a software application that is used by luggage system control system 900.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A luggage system, comprising:
a luggage body having
at least one sensor,
a propulsion module,
at least one user interface component for receiving a recipient identification information from a first user, different from a recipient, and
a luggage central processing unit (luggage CPU) connected to the at least one sensor and the at least one user interface component, and
a luggage digital storage medium (luggage storage) communicatively connected to the luggage CPU unit, wherein the luggage CPU is configured to compare the recipient identification information with information obtained by the at least one sensor, wherein the luggage CPU is configured to:
transmit an authentication request to an external device in response to receiving the recipient identification information,
receive a response to the authentication request, wherein the response includes biometric information of the recipient and recipient location information,
determine a path from a current location of the luggage system to a recipient location indicated by the recipient location information,
instruct the propulsion module to self-navigate from the current location to the recipient location,
compare the received biometric information of the recipient with information from the at least one sensor in response to the luggage system reaching the recipient location,
transmit an alert to the external device in response to a failure to identify a match between the information from the at least one sensor and the received biometric information of the recipient within a predetermined time frame, and
unlocking the luggage body in response to identifying a match between the information from the at least one sensor and the received biometric data of the recipient.

2. The luggage system of claim 1, wherein the recipient identification information includes a digital identity signature stored on a user-retained device.

3. The luggage system of claim 1, wherein the recipient identification information includes information based on at least one physical characteristic of the user.

4. The luggage system of claim 3, wherein the at least one physical characteristic of the user further comprises at least one of a facial characteristic, a voice characteristic, a skin pattern, or a biomechanical characteristic.

5. The luggage system of claim 1, further comprising a luggage transceiver configured to communicate with a remote computing device.

6. The luggage system of claim 5, wherein the luggage transceiver is configured to receive the recipient identification information from the remote computer device, and the luggage storage is configured to store the received recipient identification information.

7. The luggage system of claim 1, further comprising a locking mechanism, wherein the luggage CPU unit is configured to control the locking mechanism based on the comparison between the recipient identification information and the information obtained by the at least one sensor.

8. The luggage system of claim 1, further comprising an extendible handle, wherein a change of handle extension modifies the powered-status of the propulsion system.

9. The luggage system of claim 1, wherein a luggage system user interface is configured to select between a first mode that remains within a first distance of the first user, and a second mode that delivers an item to the recipient.

10. The luggage system of claim 9, wherein the luggage system user interface is further configured to request the recipient identification information.

11. A method of operating a luggage system, comprising:
receiving an instruction to locate a recipient from a remote computing device, wherein the instruction includes recipient identification information;
transmitting an authentication request to an external device in response to receiving the recipient identification information;
receiving a response to the authentication request, wherein the response includes biometric information of the recipient and recipient location information;
determining a path from a current location of the luggage system to a recipient location indicated by the recipient location information,
automatically controlling at least one wheel of the luggage system to move the luggage system from a current location toward the recipient based on the location information;
comparing the received biometric information of the recipient with information from at least one sensor in response to the luggage system reaching the recipient location,
transmitting an alert to the external device in response to a failure to identify a match between the information from the at least one sensor and the received biometric information of the recipient within a predetermined time frame, and
unlocking the luggage body in response to identifying a match between the information from the at least one sensor and the received biometric data of the recipient.

12. The method of claim 11, further comprising: prompting a user to input the verification information.

13. The method of claim 12, wherein prompting the user to provide verification information further comprises one or more of displaying a text message or playing a prerecorded sound to the use.

14. The method of claim 11, further comprising delivering a message to a user, different from the recipient, prior to the luggage system reaching a location of the user.

15. The method of claim 11, wherein the recipient identification information comprises a voice sample of the recipient.

16. The method of claim 11, wherein the recipient identification information comprises a fingerprint of the recipient.

17. The method of claim 11, wherein the recipient identification information comprises a visual image of the recipient.

18. The method of claim 11, wherein the recipient identification information comprises a digital identifier associated with the recipient.

19. The method of claim 11, wherein moving the luggage system further comprises:
detecting, using a luggage system sensor; an obstacle in a path of the luggage system; and
controlling the at least one wheel to move the luggage system around the detected obstacle.

20. The method of claim 19, wherein moving the luggage system further comprises:
propelling the luggage system along the determined path.

21. A luggage system, comprising:
a luggage system body;
at least one sensor configured to detect verification information about a recipient;
a transceiver for receiving recipient identifying information related to the recipient;
a luggage central processing unit (luggage CPU) connected to the at least one sensor and the transceiver, wherein the luggage CPU is configured to:
transmit an authentication request to an external device in response to receiving the recipient identifying information,
receive a response to the authentication request, wherein the response includes biometric information of the recipient and recipient location information, determine a path from a current location of the luggage system to a recipient location indicated by the recipient location information,
instruct a propulsion module to self-navigate from the current location to the recipient location,
compare the received biometric information of the recipient with information from the at least one sensor in response to the luggage system reaching the recipient location,
transmit an alert to the external device in response to a failure to identify a match between the information from the at least one sensor and the received biometric information of the recipient within a predetermined time frame, and
unlocking the luggage body in response to identifying a match between the information from the at least one sensor and the received biometric data of the recipient.

22. The luggage system of claim 21, wherein the propulsion module comprises:
at least one controllable wheel, wherein the luggage CPU is configured to control the at least one controllable wheel for propelling the luggage system along the determined path.

* * * * *